United States Patent [19]
Cordonnier et al.

[11] Patent Number: 5,475,717
[45] Date of Patent: Dec. 12, 1995

[54] METHOD OF ENSURING THAT EACH NODE OF A PRIVATE TELECOMMUNICATION NETWORK IS SYNCHRONIZED TO THE BEST AVAILABLE CLOCK AT ALL TIMES

[75] Inventors: Christine Cordonnier, Wolfisheim; Raymond Gass, Bolsenheim, both of France

[73] Assignee: Alcatel Business Systems, Paris, France

[21] Appl. No.: 352,817

[22] Filed: Dec. 1, 1994

Related U.S. Application Data

[63] Continuation of Ser. No. 804,379, Dec. 10, 1991, abandoned.

[30] Foreign Application Priority Data

Dec. 11, 1990 [FR] France ................... 90 15496

[51] Int. Cl.$^6$ ................... H04L 7/00
[52] U.S. Cl. ................... 375/356; 375/357; 370/103
[58] Field of Search ................... 375/357, 356, 375/354; 370/100.1, 103, 105, 16; 340/825.2, 825.21

[56] References Cited

U.S. PATENT DOCUMENTS

| | | | |
|---|---|---|---|
| 4,736,393 | 4/1988 | Grimes et al. | 375/107 |
| 4,794,596 | 12/1988 | Gloyne et al. | 375/107 |
| 4,837,850 | 6/1989 | Maisel et al. | 455/58 |
| 5,060,241 | 10/1991 | Allouis et al. | 375/108 |
| 5,068,877 | 11/1991 | Near et al. | 375/107 |

OTHER PUBLICATIONS

IBM Technical Disclosure Bulletin, vol. 25, No. 11B, Apr. 1983, New York, USA, pp. 6293–6298; L. S. Rogers: "clock source selection method in distributed communication system network."

*Primary Examiner*—Stephen Chin
*Assistant Examiner*—Hai H. Phan
*Attorney, Agent, or Firm*—Sughrue, Mion, Zinn, Macpeak & Seas

[57] ABSTRACT

In a method of synchronizing nodes of a private telecommunication network to the best available clock at all times, each node of the network is normally synchronized by externally originated clock signals which reach it via a point-to-point digital transmission link input. Two node inputs are preselected as main and backup master clock inputs and each node is selectively preselected as a potential supplier of clock signals to each of the nodes to which it is connected by one of its master clock inputs, the nodes of the private network interconnected in this way determining a synchronization tree. In the event of loss of clock signals an exchange of information is instigated between adjacent nodes to reconfigure the synchronization tree that these nodes constitute so that each of them is synchronized to the best available clock.

5 Claims, 2 Drawing Sheets

PRIVATE NETWORK

PRIVATE NETWORK

METHOD OF ENSURING THAT EACH NODE OF A PRIVATE TELECOMMUNICATION NETWORK IS SYNCHRONIZED TO THE BEST AVAILABLE CLOCK AT ALL TIMES

This is a continuation of application Ser. No. 07/804,379 filed Dec. 10, 1991, abandoned.

BACKGROUND OF THE INVENTION

1. Field of the Invention

The invention concerns a method of synchronizing the nodes of a private telecommunication network to the best clock available at any time; it also concerns a private telecommunication network adapted to implement the above method.

2. Description of the Prior Art

Telecommunications networks, and in particular public telecommunication networks, are conventionally synchronized by means of a distribution structure in which a very high quality master clock, possibly selected from a number of clocks, produces synchronization signals for a set of slave clocks which are distributed in the various nodes of the telecommunication network to govern their operation.

In very large networks a hierarchical organization of the various clocks has conventionally been adopted and is usually under the supervision of administration personnel responsible for securing optimum synchronization at all times.

This personnel is therefore provided with appropriate information and control means, for example at a monitoring center, and in particular is responsible for modifications to the configuration of the distribution structure for clock signals that are made necessary by various events likely to affect clock distribution, in particular failure of node equipment or links.

For various, and in particular economic, reasons a solution of this kind is not well suited to private telecommunication networks which are nothing like the size of large public networks, for which the permanent presence of supervisory personnel is not a requirement and in respect of which the freedom of choice between optimum technical solutions is limited by considerations of cost.

SUMMARY OF THE INVENTION

The invention therefore proposes a method which combines a preliminary configuration phase with a management phase to ensure that the nodes of a private telecommunication network are synchronized at all times to the best available clock, each node of the network being normally synchronized by externally originated clock signals which reach it via one of its point-to-point digital information transmission link inputs.

According to one feature of the invention two inputs of each node of the network, when the latter comprise at least two inputs, are preselected with one as a main master clock input and the other as a backup master clock input.

Each node having two master clock inputs may be preselected as a potential supplier of clock signals to each of the nodes of the private network to which it is connected via one of its master clock inputs, the nodes of the private network interconnected in this way determining a synchronization tree of which any nodes which have only one master clock input are also part.

In the event of loss of the clock signals transmitted to one node of the tree, or of loss of valid signals, an exchange of information is instigated at the initiative of the first node which notices the loss with at least any node of the tree to which it is connected by a point-to-point link, the subordinate relationship or non-subordinate relationship of a node of the tree relative to the clock signal of another node to which it is connected by a point-to-point link within the tree being determined according to the respective potentiality for supplying clock signals initially attributed to each of these nodes relative to each other and according to the quality levels of clock signals available to each.

The invention also proposes a private telecommunication network adapted to implement the method in accordance with the invention, the network comprising nodes interconnected by point-to-point digital information transmission links, each node being normally synchronized by externally originated clock signals which reach it over a transmission link via a corresponding input either from another node of the private network or from a node of a public network to which it is connected by an appropriate digital information transmission link.

According to one feature of the invention each node of the private network having at least two inputs comprises a preselected main master clock input and a preselected backup master clock input to each of which is selectively assigned a potential to supply clock signals to that of the adjacent nodes to which the input is connected by one of the transmission links.

Each node of the private network further comprises an automatic processor choosing the source of clock signals for the node which includes it on the basis of preselections specific thereto and according to the quality levels of externally originated clock signals or, if no externally originated clock signals are available, according to the quality levels of internally originated clock signals remaining available to the node in the event of loss of clock signals or of valid clock signals previously received; the node including the automatic processor in question is accordingly provided with means for exchanging clock selection information with each of the nodes to which it is connected via a master clock input.

The invention, its features and its advantages are described hereinafter with reference to the appended drawings.

DETAILED DESCRIPTION OF THE INVENTION

The method of configuring and managing the clock signal distribution structure of a private telecommunication network which is put forward by the invention is adapted to be used in the context of a telecommunication network 1 made up of a plurality of nodes 2 each constituted by a digital switching installation.

Lines 3 each comprising at least one bidirectional digital information transmission link provide point-to-point links interconnecting the nodes of the network.

The lines 3 which transmit information in digital form are, for example, time-division multiplex link as specified in CCITT Recommendation G.704, although this example must not be regarded as limiting on the invention.

Each node 2 is connected to at least one other node of the network 1 comprising it and may also be connected to one or more other public telecommunication network nodes 4 which may belong to different public networks, for example in a border area between two countries.

Figure 2:
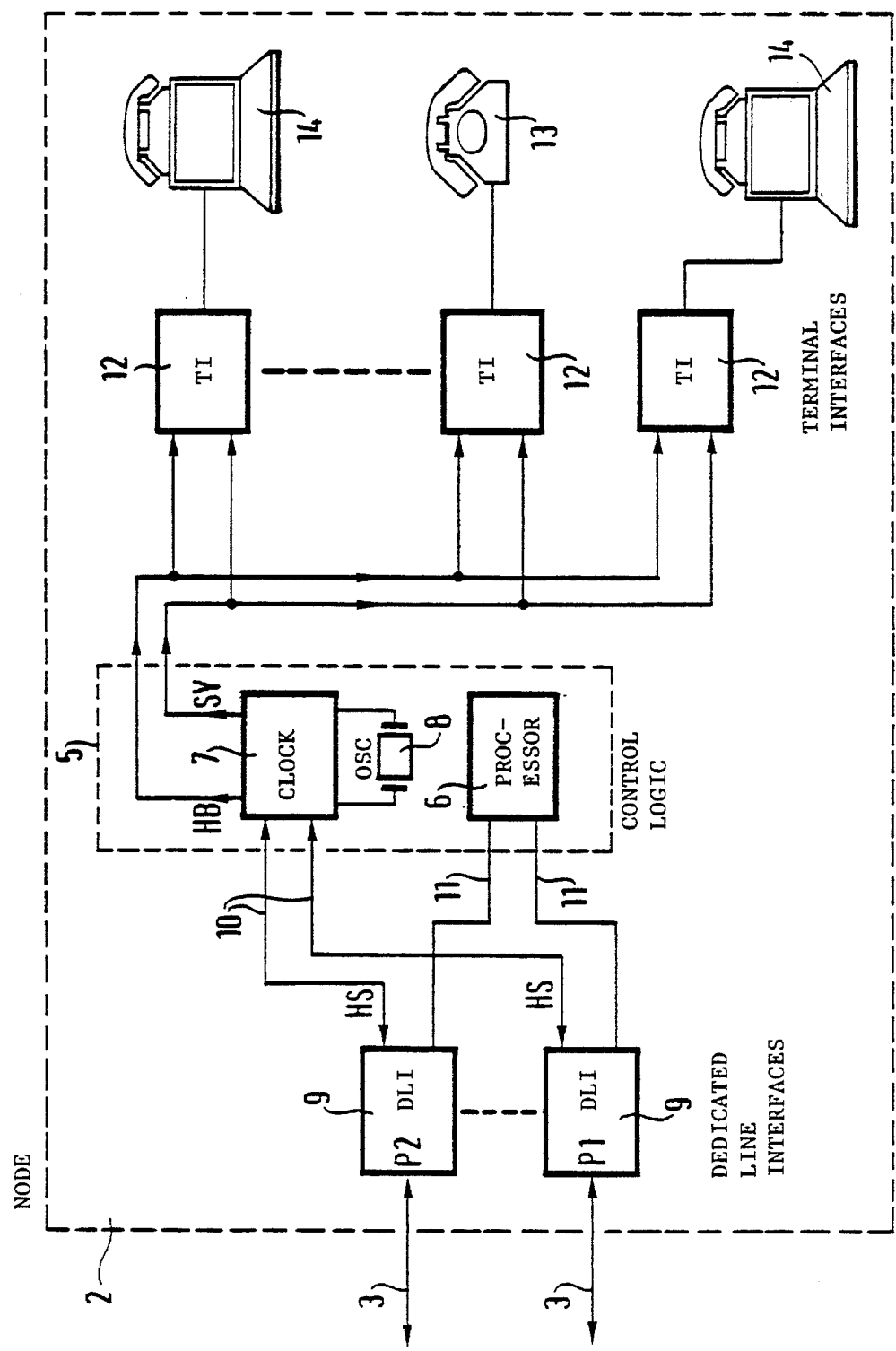
FIG. 2 shows one example of a digital switching installation of a telecommunication network node.

FIG. 2 shows one example of the structure of a node 2 of the telecommunication network.

The node 2 is implemented in the known way by assembling dedicated modular units which are interconnected as required; it includes control logic 5 conventionally based on at least one processor 6 associated with memories (not shown) which hold at least some of the programs whereby the node operates in its environment, to be more precise in the telecommunication network of which it forms part.

In the example put forward the control logic 5 also includes a clock 7 which is responsible for supplying to the node 2 the clock signals HB that it needs and derived either from signals produced by a local oscillator 8, here shown in the symbolic form of a quartz crystal oscillator, or from clock signals HS originating from clocks (not shown) external to the node via the links 3.

The clock signals HS possibly received by the clock 7 of a node are produced either by the clock 7 of another node 2 of the same private network or by a clock (not shown) of a public network, the latter being regarded as having to take precedence because of their assumed qualities.

The point-to-point links provided by the lines 3 between two nodes 2 or between a node 2 and a node 4 terminate at dedicated line interfaces 9.

In the conventional manner that will not be described in detail here as it is related only indirectly to the invention, each interface 9 of a line 3 is adapted to combine in a predetermined way information, signalling and clock signals to be sent by the node 2 of which it is part to another node, for example over a unidirectional time-division multiplex link of a line 3 to which the interface is connected by a port P1 or P2.

Each interface 9 is also adapted to be able to separate the different types of signals mentioned above when these reach it via a clock signal input of one of its ports from said other node via a link in the opposite direction to that mentioned above.

For these operations each of the interfaces 9 of a node is connected to the control logic 5 of the node firstly at the clock 7 via internal links 10, shown here as individual links, and secondly at the processor 6 via a link 11 adapted to transmit information and signalling signals.

Other lines, not shown here because they are not related directly to the invention, are used to connect other equipment to the processor 6 and to the interfaces 9 of the lines 3, this equipment comprising, for example, terminal interfaces 12 for various terminals connected to the node in question, the terminals being symbolically represented in this instance by a digital telephone 13 and by videotex terminals 14.

In a known manner that will not be further explained here, the clock 7 of the node 2 supplies to the terminal interfaces 12 clock signals HB and synchronization signals SY which are needed by the terminals 13, 14 connected to these interfaces. It also supplies the clock signals needed by the line interfaces 9 which, as explained above, are either signals produced by the clock 7 from its local oscillator 8 or signals extracted by the clock 7 from clock signals HS received from a clock of another node 2 or 4 via one of the interfaces 9 of the lines 3 of the node 2 which incorporates it.

As mentioned above in the introduction to this description, the synchronization strategy for the network 1 is directed to achieving a maximal level of quality of the clock signal distributed to the various nodes, in particular if the network 1 is connected to public network nodes.

CCITT Recommendation G.822 defines quality rules and in particular the number of slips allowed in exchanges between a node 2 of the private network and a node 4 of the public network.

A first examination of this recommendation indicates that the accuracy required of an individual local clock is in the order of $2.7 \times 10^{-9}$, representing one slip per day, which implies a clock 7 of very high cost, which is unacceptable for practical reasons in a private network.

A first solution is to use signals produced by any quality clocks that may normally be accessible even though they are external to the network 1 concerned.

This is possible if clock signals having the required qualities are available at one or more external nodes 4 to which at least one node 2 of the network 1 is connected by a line 3.

This is the case in particular if the network 1 is a private network connected to at least one node 4 of a public network via at least one of its own nodes 2 and the clock of the node 4 has the required level of quality, which enables the various nodes of the private network to be synchronized as required by progressive transmission between nodes 2 of the private network according to a method which is explained later, taking the clock obtained from the public network as a reference.

The Recommendation G.822 mentioned above also specifies that the accuracy may be reduced to $0.4 \times 10^{-6}$, representing twelve slips in an hour in 0.4% of cases, which in practice corresponds to the probability of failure of a line 3. Achieving this accuracy in an operating network is difficult to guarantee unless specific and costly precautions are taken, which is not ideal in the case of a limited size network as explained above.

The Recommendation G.822 further provides that in 0.04% of cases there is no fixed constraint, which corresponds in practice to a double fault, in other words to 1% of 1% or a failure probability of $10^{-4}$.

Consequently, it is necessary to guard against the effects of a signal fault at a node 2 which implies that a node should, if possible, have at least two separate inputs for clock signals of the required quality level if it is not able itself to produce internally signals having this quality level.

This is achieved in accordance with the invention by initially configuring the network 1 so that, if possible, each node 2 has two master clock inputs for synchronizing it independently connected to respective clock transmission links consisting, for example, of digital information transmission links of a line 3 providing a point-to-point link between this node 2 and other nodes 2 or 4. This does not concern the single-input nodes like the node 2C in FIG. 3, of course.

The clock signal distribution structure for a given private network is in the form of a synchronization tree comprising all the nodes of the network for which two master clock inputs have been preselected and which are therefore connected to two other nodes of the private network or possibly of a public network. This tree may additionally comprise the nodes of the private network in question which have only one master clock input.

Figure 1:
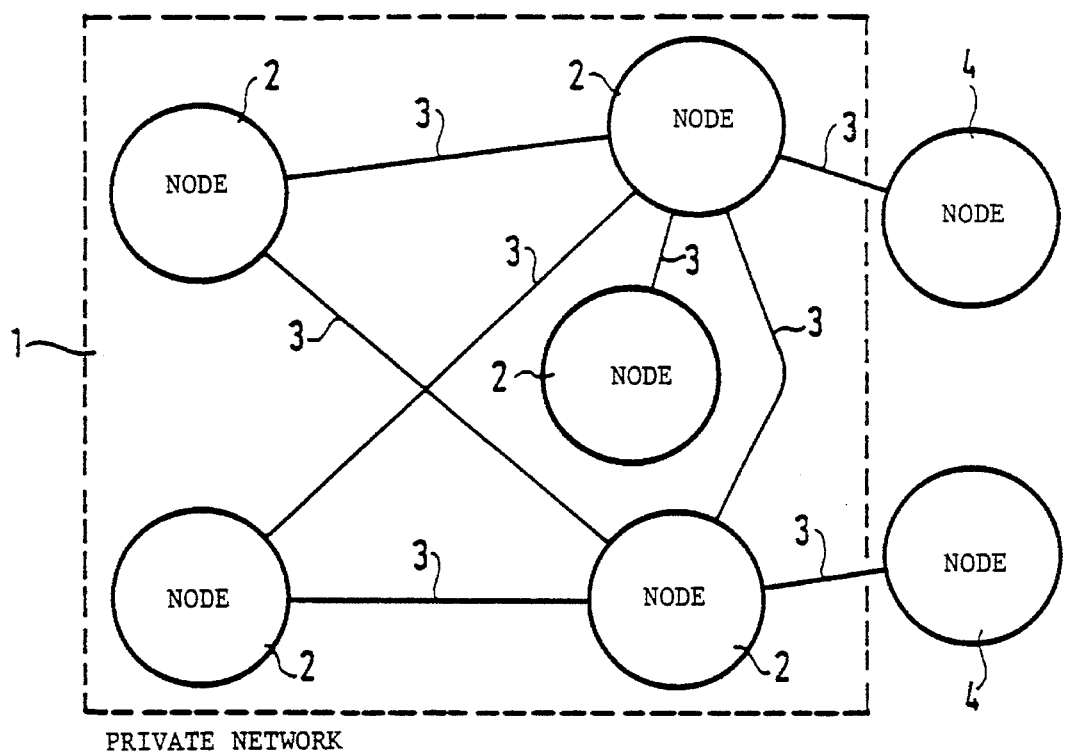
FIG. 1 shows one example of a private telecommunication network structure.
Figure 3:
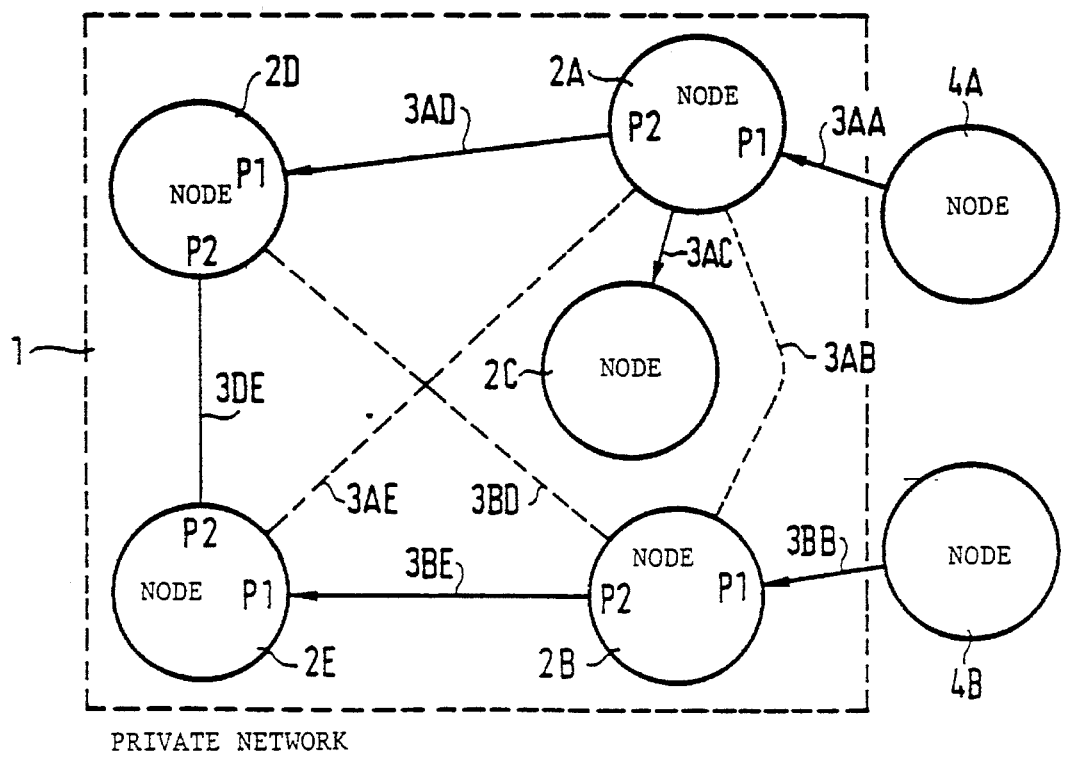
FIG. 3 shows one example of a synchronization tree for the private telecommunication network shown in FIG. 1.

An example of a synchronization tree configured in accordance with the invention is shown in FIG. 3 for the network 1 shown in FIG. 1 whose five nodes are here denoted 2A through 2E.

The network 1 is a private network connected to two nodes 4A, 4B of a public network. As a general rule, the nodes of a private network connected to a public network must be synchronized to the public network and there is therefore initially provision for the clock signals transmitted from a public network node to a node of the network 1 over a digital transmission link connecting the two nodes to serve as main master clock signals for the private network node.

Thus the clock signals from the node 4A of the public network which are transmitted over a clock transmission link 3AA connecting the nodes 4A and 2A are normally used as main master clock signals made by the node 2A; the same applies to the clock signals transmitted from the node 4B over a clock transmission link 3BB to the node 2B where they are used as main master clock signals.

For the reasons mentioned above, it is desirable that each node of the network 1 should have a backup master clock which is able to supply it with clock signals if the main master clock signals normally received are no longer usable because of a malfunction of any kind and if the clock signals that the node itself produces are not of the required quality, which is usually the case.

Consequently, the telecommunication network 1 is initially configured so that each node having a port providing inputs for at least two digital information transmission links is able to receive preselected master clock signals from two inputs as main and backup clock signals according to the quality of the clock signals likely to be transmitted to the node by the nodes to which it is connected by the two inputs concerned.

It is therefore possible at each node of the network 1 having at least two potential clock signal inputs to define and to memorize, with reference to their inputs at the node, two preselected clock transmission links to supply these signals, such as the links 3BE and 3DE for the node 2E.

As the direction of transmission of the clock signals may be reversed for a link following an event affecting the distribution of these signals, it is by reference to the input/output port that the clock transmission links are identified at each node.

Thus the clock transmission link chosen to supply the main master clock signals to a node is identified with reference to the port P1 at which it terminates.

The port P2 of a node identifies in exactly the same way the input at which the clock transmission link chosen to supply the backup master clock associated with a main master clock terminates.

In the context of the invention these choices are fixed and define a synchronization tree configuration of the private network comprising firstly all the nodes having two digital information transmission link inputs, possibly the nodes which have only one such input and lastly all the preselected links for transmitting clock signals for the various nodes of the private network.

A synchronization tree of this kind normally remains unchanged in the absence of overall reinitialization of the private network, for example following modification of the network 1 by adding to it.

However, the distribution of the clock signals in the fixed synchronization tree may evolve in time as events occur. In the configuration shown in FIG. 3 each two-input node of the network 1 is controlled by clock signals which reach it through its port initially chosen as port P1, in other words its main master clock input.

Thus the port P1 of the node 2A is the port of this node at which the clock transmission link 3AA carrying the main master clock signals from the node 4A of a public network terminates.

The same applies to the port P1 of the node 2B at which a clock transmission link 3BB connecting the nodes 2B and 4B terminates, the latter being part of a public network which may be a different network to that of which the node 4A is part.

For the two-input nodes of the network 1 which are not connected to a public network node, the chosen ports P1 represent inputs of clock transmission links which, as mentioned above, supply the best available master clock signals from an adjacent node, such as the port P1 of the node 2D receiving main master clock signals from the adjacent node 2A via the link 3AD.

The same applies to the ports P2 of all the nodes of the network 1 which are chosen from those able to supply the best available master clock signals from an adjacent node, excluding of course those chosen as ports P1.

The best backup master clock available may be of the same quality as the main master clock for a given node, for example if this node is connected to the same public network by two different incoming time-division multiplex links.

Consequently, in the initial configuration each node of the network 1 preferably has two different master clock signal inputs which are each connected to a different digital transmission link and which each form part of a different port of the node, such as for example the node 2E structured in the initial configuration to receive main clock signals from the node 2B over a clock transmission of the line 3BE or backup master clock signals from the node 2D over a clock transmission link of the line 3DE.

Any other digital transmission link connecting the node 2B and another node, such as the link 3AE, is not then included in the synchronization tree of the network 1 as considered here.

A malfunction affecting the synchronization tree of a node or a master clock transmission link of the network 1 may lead to partial reorganization of the clock distribution structure previously used.

According to the invention, this partial reorganization can be effected automatically by the network 1 itself using the possibility for exchanging information offered by the digital information transmission links used to transmit clock signals and the information processing possibility offered by the processors at the node.

The occurrence of an event affecting clock distribution in the network 1 is detected by the node(s) which are directly affected but may not be detectable by nodes subordinate to the directly affected node(s).

In the absence of specific provisions, these subordinate nodes are likely to continue to receive the master clock signals that they need given that another clock source is normally substituted for the malfunctioning source at the directly affected node or at each directly affected node, even if the quality of the master clock signals then supplied to the subordinate nodes is no longer exactly the same as previously. To attempt to recover this quality each subordinate node must know the present possibilities of the node(s) to which it is connected by preselected clock transmission link(s) via a single port or preferably via its two ports P1 and P2 to obtain the most appropriate master clock signals.

Provision is therefore made for exchange of information between the nodes which are interconnected by transmission links which are part of the clock distribution synchronization tree so that each node of this tree can ensure for itself that the clock signals which it receives come from the best available source.

Each node of the network 1 therefore comprises transmitter-receiver type means for individual exchange of information with all the adjacent nodes of the network to which it is connected by a point-to-point digital transmission link interconnecting two nodes of the synchronization tree providing clock distribution in the network 1.

This information is in this example obtained from characteristic data of the node which is fixed when a given synchronization tree is initially configured in a given network structure 1 and which is stored by the node to which it relates.

In the implementation under discussion, the characteristic data of a node comprises an indication as to the theoretical level of quality of the source of clock signals supplying each of its two master clock inputs and an indication as to the potentiality of the node to supply clock signals to each of the other nodes to which it is connected by a digital transmission link via one of its master clock inputs and consequently via the corresponding port P1 or P2.

In this example the quality level indication for a node is a binary indicator and specifies if the master clock signals to be received by a port P1 or P2 of this node come from an adjacent node of a public network (and are therefore assumed to conform to the strict standards of such networks) or if they come from another node of the telecommunication network 1.

Likewise, the indication as to the potentiality selectively assigned to the node of the network 1 to supply clock signals to other nodes of the same network to which it is connected by digital transmission links via its clock inputs in the context of a given synchronization tree is a fixed binary indicator.

It is therefore possible to define seven possible meaningful variant combinations of these two indicators and consequently seven possible stable states for the various nodes of the network 1 each assumed to be receiving master clock signals via its port P1.

For example, loss of clock signals (or valid clock signals) previously received at one node of the network 1 initiates the transmission of a first indicator by the node concerned to each of the adjacent nodes to which it is connected by a digital transmission link via one of its master clock inputs in the context of the applicable transmission tree. This information, and other information to be defined later, is transmitted for example during three bit times otherwise available in the first frame timeslot of the odd frames of a superframe if the clock transmission links are time-division multiplex links as defined above.

The node 2 which initiates an exchange of information between two nodes of the private network 1 sends a proposal to synchronize one of them to clock signals from the other to which it is connected by a digital transmission link via one of its master clock inputs; this proposal depends on its own potentiality as a clock supplier as initially preselected.

This results in the sending of three bits representing either an instruction sent by the initiator node to the other node, in the form of a binary code 000, for example, if the initiator node was originally preselected as being able to supply clock signals, or a request addressed by the initiator node to the other node with a view to assuming slave status, said other node then having to be able to supply the clock signals to the initiator node, which has become a slave, a binary code 100 being sent to this end by the initiator node, for example.

A response is expected by the initiator node from the private network node previously considered and this response may take the form of acquiescence to the synchronization proposal in the form of a binary code 001, for example, or refusal in the form of a binary code 011 if the node interrogated is a node which is part of the transmission tree of the private network 1. A binary code 111 is supplied by default if the node interrogated is not able to respond, which occurs in particular when the interrogated node is part of a public network in which there is no provision for exchange of information as described above.

Following the interrogation by a node of at least one of the two nodes to which it is connected by its master clock inputs corresponding to the ports P1 and P2, this node chooses the clock to which it is to be synchronized on loss of clock signals or of valid clock signals initially reaching it through its main clock input P1.

Loss of signals is caused, for example, by the deactivation of the digital information transmission link connecting two nodes. Loss of valid signals is caused, for example, disappearance of the signal or by loss of frame synchronization.

A clock is chosen by a node of the synchronization tree according to preselected and memorized indicators of master clock inputs and potentiality of supplying clock signals to the node concerned in respect of nodes to which this node is connected by its master clock inputs.

To this end each node 2 of the synchronization tree of a private network 1 in accordance with the invention comprises an automatic processor in its control logic 5 to choose the source of clock signals which are used by the node and which may be transmitted to subordinate nodes.

A subordinate node may be a node which is slaved only in a given configuration of the synchronization tree, for example the node 2D relative to the node 2A in FIG. 3; it may be a node having only a single master clock signal input like the node 2C.

The automatic processor of each tree node modifies the distribution of clock signals at the node in this tree from the initially preselected configuration in the case of loss of clock signals or of valid clock signals disturbing the synchronization tree and affecting the node in question directly or indirectly.

If a node 2 of the synchronization network is connected by a master clock input to a public network node 4 it receives from the latter clock signals to which it is synchronized and which it may retransmit, its main clock input being the priority input for receiving these signals.

Each node 2 with two preselected inputs of a synchronization tree in accordance with the invention is also able either to receive clock signals from another node of the tree or to synchronize to clock signals that it produces itself internally, as explained above.

Clock signals are received from a node, from another node of the tree, after a clock malfunction leading to a control phase; this is initiated by one or other of the two nodes, for example by the initiator node sending code 000 or 100; it normally implies acquiescence by the interrogated node which responds by sending an acceptance code (001, for example). A node synchronizes itself internally if the external clock signals that it is able to receive are not of a level of quality higher than that of the internal clock it incorporates.

A specific code (110, for example) can then be sent by a node synchronized to its internal clock to respond to a synchronization proposal sent by another (exchange initiator) node.

A special code 110 may also be sent in various other cases by a node of the synchronization tree losing the external clock signals normally received via its main clock input and being obliged to synchronize itself internally.

Non-acquiescence by a node to a synchronization proposal results in synchronization of the initiator node either to clock signals that it produces itself or to signals that the other node produces if the level of quality of the clock signals available to the initiator node is below that available to the interrogated node.

The automatic processor of each synchronization tree node is designed to take a decision in each of the situations with which a node is likely to be confronted on the basis of preselection indicators adopted initially for this node and synchronization information as mentioned above received via digital transmission links 3 connected to the two master inputs of the node in which it is resident.

It is thereby possible to synchronize the node of a private telecommunication network at all times to the best available clock at a cost that is much lower than that needed to implement solutions known from public networks.

There is claimed:

1. A method of synchronizing nodes of a private telecommunication network to best available clock signals at all times, wherein said private telecommunication network comprises a plurality of nodes which transmit at least synchronization information to each other via point-to-point digital transmission links, each node of said private telecommunication network comprising means for storing node characteristic data comprising information indicating available clock signals, respective quality levels of said available clock signals, and potential supply information indicating whether a node is adapted to supply clock signals, and means for selecting a best available clock signal based upon said node characteristic data and said synchronization information exchanged between nodes when a loss of previously received clock signals is detected, said nodes being synchronized by clock signals supplied by one of said point-to-point digital transmission links, said method comprising the steps of:

preselecting, for each node directly connected to at least two point-to-point digital transmission links, at least two point-to-point digital transmission link ports, one being designated a master clock port and the other being designated a backup clock port, wherein nodes comprising said at least two point-to-point digital transmission link ports form a synchronization tree of said private telecommunication network;

preselecting said nodes comprising said at least two point-to-point digital transmission link ports as potential supplier nodes for potentially supplying said clock signals to nodes which are directly connected to said potential supplier nodes via a point-to-point digital transmission link, wherein said nodes comprising said at least two point-to-point digital transmission link ports are assigned potential supply information;

storing said potential supply information as one of said node characteristic data;

detecting a loss of said previously received clock signals by at least one of said nodes;

initiating an exchange of said synchronization information between said at least one of said nodes detecting said loss of said previously received clock signals and each node directly connected to said at least one of said nodes via a corresponding point-to-point digital transmission link, wherein each exchange of said synchronization information corresponds to a synchronization proposal which is one of: (a) from said at least one of said nodes having detected said loss of said previously received clock signals to one of said nodes directly connected to said at least one of said nodes, and (b) one node having received said synchronization proposal to another node with which said one node is directly connected via a point-to-point digital transmission link; and determining, for said at least one of said nodes detecting said loss of said previously received clock signals and for each of said nodes receiving said synchronization proposal, a best available clock signal for synchronization based upon said synchronization information transmitted and received during said exchange step.

2. The method according to claim 1, wherein said exchange step comprises the step of transmitting a synchronization proposal corresponding to a synchronization instruction when a node initiating said exchange is one of said potential supplier nodes, and corresponding to a synchronization request when said node initiating said exchange is not one of said potential supplier nodes.

3. The method according to claim 2, wherein said exchange step comprises the step of receiving a reply from one of said nodes receiving said synchronization proposal, said reply being one of acquiescence and non-acquiescence based upon a quality level of available clock signals available to said node receiving said synchronization proposal.

4. A private telecommunication network comprising:

a plurality of nodes interconnected via point-to-point digital transmission links, said plurality of nodes transmitting at least synchronization information to each other and with at least one node of a public telecommunication network via said point-to-point digital transmission links, each of said nodes being programmed with node characteristic data comprising information indicating available clock signals, respective quality levels of said available clock signals, and potential supply information indicating whether a node is adapted to supply clock signals;

each node of said private telecommunication network comprising:

a point-to-point digital transmission link port for each point-to-point digital transmission link connected to a particular node;

wherein for each node comprising more than one point-to-point digital transmission link port, one of said point-to-point digital transmission link ports is designated a master clock port and another point-to-point digital transmission link port is designated a backup clock port;

means for exchanging said synchronization information with adjacent nodes via corresponding point-to-point digital transmission links; and an automatic controller, coupled to said master clock port and to said backup clock port, which detects loss of previously received clock signals and which selects, upon detection of said loss, a best available source of clock signals based upon said node characteristic data programmed within said automatic controller and said synchronization information exchanged between said node comprising said automatic controller detecting said loss and each node directly connected to said node via a corresponding point-to-point digital transmission link;

wherein each node of said private telecommunication network is synchronized by clock signals obtained from one of said point-to-point digital transmission links to which it is connected via a corresponding point-to-point digital transmission link port; and wherein a synchronization tree is formed comprising all nodes which respectively comprise more than one point-to-point digital transmission link port.

5. The private telecommunication network according to claim 4, where each of said nodes further comprises:

a memory for storing said node characteristic data.

* * * * *